(12) United States Patent
Ostwald et al.

(10) Patent No.: US 6,327,519 B1
(45) Date of Patent: Dec. 4, 2001

(54) METHOD AND SYSTEM FOR TRANSFERRING ENERGY BETWEEN ROBOTIC MECHANISMS IN AN AUTOMATED STORAGE LIBRARY

(75) Inventors: Timothy C. Ostwald, Louisville; Frank Smith, Nederland, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/661,031

(22) Filed: Sep. 13, 2000

Related U.S. Application Data

(63) Continuation-in-part of application No. 09/602,549, filed on Jun. 23, 2000.

(51) Int. Cl.[7] .................................................. G06F 19/00
(52) U.S. Cl. ......................... 700/245; 700/213; 700/214; 700/215; 700/198; 700/248; 700/249; 700/251; 700/253; 700/254; 318/568.13; 318/568.19; 318/574; 360/92; 360/69; 360/71; 369/34; 369/36; 369/38; 369/39; 901/42
(58) Field of Search ..................................... 700/213, 214, 700/215, 198, 218, 254, 253, 259, 245, 248, 249, 251; 318/568.19, 568.13, 574; 360/92, 69, 71, 94; 369/36, 34, 38, 39; 901/42, 9; 701/23

(56) References Cited

U.S. PATENT DOCUMENTS

| | | |
|---|---|---|
| 4,362,977 | 12/1982 | Evans et al. . |
| 4,481,592 | 11/1984 | Jacobs et al. . |
| 4,590,578 | 5/1986 | Barto, Jr. et al. . |
| 4,761,745 | 8/1988 | Kodaira . |
| 4,763,276 | 8/1988 | Perreirra et al. . |
| 4,937,690 | 6/1990 | Yamashita et al. . |
| 4,954,762 | 9/1990 | Miyake et al. . |
| 5,041,991 | 8/1991 | Fujiki . |
| 5,289,589 | 2/1994 | Bingham et al. . |
| 5,333,242 | 7/1994 | Watanabe et al. . |
| 5,377,121 | 12/1994 | Dimitri et al. . |
| 5,497,057 | 3/1996 | Danielson et al. . |
| 5,546,366 | * 8/1996 | Dang ..................................... 360/92 |
| 5,600,760 | 2/1997 | Pryor . |
| 5,818,723 | 10/1998 | Dimitri . |
| 5,894,461 | 4/1999 | Fosler et al. . |
| 5,898,593 | 4/1999 | Baca et al. . |
| 5,914,919 | 6/1999 | Fosler et al. . |
| 5,970,030 | 10/1999 | Dimitri et al. . |
| 6,175,466 | * 1/2001 | Hori et al. .............................. 369/36 |

OTHER PUBLICATIONS

Beccari et al., A real–time Library for the design of hybrid robot control architectures, 1998, IEEE, pp. 1145–1150.*
Kendall, Cimarron user experience, 1998, IEEE, pp. 93–97.*
Tanabe et al., Redundant Optical Storage System Using DVD–RAM Library, 1999, IEEE, pp. 80–87.*

* cited by examiner

*Primary Examiner*—William A. Cuchlinski, Jr.
*Assistant Examiner*—McDieunel Marc
(74) *Attorney, Agent, or Firm*—Brooks & Kushman P.C.

(57) ABSTRACT

A storage library includes a first robotic mechanism having an energy coupler and a second robotic mechanism having an energy coupler. The storage library further includes tracks disposed adjacent to media object storage cells for enabling access to each of the media object storage cells, and powered rails associated with the tracks for providing energy. The first robotic mechanism is movable toward the second robotic mechanism to enable the energy coupler of the first robotic mechanism to couple with the energy coupler of the second robotic mechanism to transfer energy from the first robotic mechanism to the second robotic mechanism. The energy couplers of the first and second robotic mechanisms couple together to transfer energy from the powered rails to the second robotic mechanism. The energy couplers of the first and second robotic mechanisms couple together to transfer energy between on-board energy sources.

23 Claims, 3 Drawing Sheets

METHOD AND SYSTEM FOR TRANSFERRING ENERGY BETWEEN ROBOTIC MECHANISMS IN AN AUTOMATED STORAGE LIBRARY

CROSS-REFERENCE TO RELATED APPLICATIONS

This application is a continuation-in-part application of co-pending application U.S. Ser. No. 09/602,549, filed on Jun. 23, 2000, entitled "Diagnostic Port Between Independent Robots."

TECHNICAL FIELD

The present invention relates generally to automated media storage library systems having robotic mechanisms that move about tracks for manipulating media objects such as cartridges within the storage libraries and, more particularly, to an automated storage library method and system for transferring energy from a functional robotic mechanism to a disabled robotic mechanism for enabling the disabled robotic mechanism to become functional.

BACKGROUND ART

Existing automated media storage libraries are capable of storing and retrieving large quantities of information stored on media objects such as cartridges. This is accomplished by the use of a large number of cartridge storage cells, each of which houses a media cartridge, that are housed within an enclosure. Such storage libraries use a robotic mechanism (e.g., robot, picker, handbot, accessor, and the like) to quickly move the media cartridges between their media cartridge storage cells and media cartridge players. For example, to retrieve information that is stored on a selected media cartridge, a robotic mechanism moves to a location opposite the media cartridge storage cell housing the selected media cartridge. An end effector of the robotic mechanism then grasps the media cartridge and extracts it from the media cartridge storage cell to a media player where the end effector loads the media cartridge into the media player.

As automated storage libraries have become larger and more complex, their designs have evolved from a single robotic arm performing all media cartridge manipulations to multiple robotic mechanisms operating on several media cartridges and media players simultaneously. The ability to manipulate several media cartridges simultaneously has increased the throughput of the automated storage libraries. While one independent robotic mechanism is busy transferring one media cartridge from a media storage cell to a media player for mounting, a second independent robotic mechanism can be transferring another media cartridge to an access port, while a third robotic mechanism may be conducting an inventory of the storage library.

A typical automated storage library includes support tracks and electric powered rails laid throughout the storage library. The robotic mechanisms mount to the tracks to move throughout the storage library to access the media cartridges and the media players. The robotic mechanisms may include drive or propulsion means coupled to driving wheels for moving along the tracks. The robotic mechanisms may further include media cartridge pickers, bar code reading devices, and other task oriented sub-modules for performing various tasks on media cartridges and media players. The robotic mechanisms may receive electric energy from a remote energy source via the electric powered rails. The robotic mechanisms may include an on-board source of energy such as a battery for powering the propulsion means and the task oriented sub-modules such as a media cartridge picker. The robotic mechanisms use energy to provide power to the propulsion means for driving the drive wheels to move the robotic mechanism along the tracks. Likewise, the robotic mechanisms use energy to provide power to the media cartridge picker for holding on to media cartridges to move the media cartridges between the robotic mechanism and the media cartridge storage cells and the media player.

A problem occurs when either the on-board source of energy runs low or the robotic mechanism is not receiving sufficient energy from the electric powered rails. For example, the robotic mechanism may not be receiving enough energy from the electric powered rails because of a mechanical condition such as a broken brush. In either of these events, the robotic mechanisms may not have enough power for either the propulsion means or the media cartridge picker to perform their functions. For instance, the propulsion means may not receive enough power to move the robotic mechanism. As a result, the robotic mechanism would become stuck on the tracks and not be able to move. The stuck robotic mechanism prevents other robotic mechanisms to move along the tracks. Similarly, the media cartridge picker may not receive enough power to fully load or unload a media cartridge from the robotic mechanism or media cartridge storage cell causing the media cartridge to become stuck between the robotic mechanism and the media cartridge storage cell. Because of the stuck media cartridge the robotic mechanism can not move along the tracks as damage to itself or the media cartridge would occur during attempted movement away from the media cartridge storage cell. The stuck media cartridge effectively makes the robotic mechanism stuck on the tracks. As before, the stuck robotic mechanism prevents other robotic mechanisms from moving along the tracks.

In the past, operator intervention has been required to correct the problems associated with low energy and the attendant consequences of stuck robotic mechanisms. To do this, the storage library must be taken offline so that an operator can enter the storage library to remedy the cause of the problem. For example, the operator must enter the storage library to recharge or repair the energy source of the robotic mechanism, repair the mechanical condition preventing the robotic mechanisms from receiving sufficient energy from the rails, or remove the stuck robotic mechanism in order to correct the problem. Consequently, this remedy results in lower storage library uptime. What is needed is an automated storage library method and system for transferring energy from a functional robotic mechanism to a disabled robotic mechanism for enabling the disabled robotic mechanism to become functional.

SUMMARY OF THE INVENTION

Accordingly, it is an object of the present invention to provide an automated storage library method and system for transferring energy from a functional robotic mechanism to a disabled robotic mechanism for enabling the disabled robotic mechanism to become functional.

It is another object of the present invention to provide an automated storage library method and system for transferring energy from a functional robotic mechanism to a disabled robotic mechanism stuck on a track of the storage library for enabling the disabled robotic mechanism to become unstuck and move about the storage library.

It is a further object of the present invention to provide an automated storage library method and system for transferring energy from a functional robotic mechanism to a disabled robotic mechanism having a stuck media cartridge for enabling the disabled robotic mechanism to move the media cartridge about the storage library.

In carrying out the above objects and other objects, the present invention provides a storage library provided with a first robotic mechanism having an energy coupler and a second robotic mechanism having an energy coupler. The energy coupler of the first robotic mechanism couples with the energy coupler of the second robotic mechanism to transfer energy from the first robotic mechanism to the second robotic mechanism.

The storage library may include tracks disposed adjacent to media cartridge storage cells for enabling access to each of the media cartridge storage cells, and further include powered rails associated with the tracks for providing energy. The energy coupler of the first robotic mechanism couples with the energy coupler of the second robotic mechanism to transfer energy from the powered rails to the second robotic mechanism. The first robotic mechanism may move along the tracks toward the second robotic mechanism to enable the energy coupler of the first robotic mechanism to couple with the energy coupler of the second robotic mechanism.

The first robotic mechanism may have an energy source and the energy coupler of the first robotic mechanism couples with the energy coupler of the second robotic mechanism to transfer energy from the energy source of the first robotic mechanism to the second robotic mechanism.

The second robotic mechanism may have an energy source and the energy coupler of the first robotic mechanism couples with the energy coupler of the second robotic mechanism to transfer energy from the first robotic mechanism to the energy source of the second robotic mechanism.

The second robotic mechanism may have a propulsion mechanism and the energy coupler of the first robotic mechanism couples with the energy coupler of the second robotic mechanism to transfer energy from the first robotic mechanism to the second robotic mechanism in order to drive the propulsion mechanism to move the second robotic mechanism along the tracks of the storage library.

The second robotic mechanism may have a gripper mechanism and the energy coupler of the first robotic mechanism couples with the energy coupler of the second robotic mechanism to transfer energy from the first robotic mechanism to the second robotic mechanism in order to drive the gripper mechanism to grip the media cartridges.

In carrying out the above objects and other objects, the present invention further provides an associated method for operating the storage library.

The advantages associated with the present invention are numerous. The critical performance measurement of automated storage libraries is the amount of continuous, service free hours of operation. The present invention enables the automated storage libraries to service themselves while allowing the automated storage libraries to satisfy the data requirements of hosts thereby keeping the downtime of the storage libraries to a minimum.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
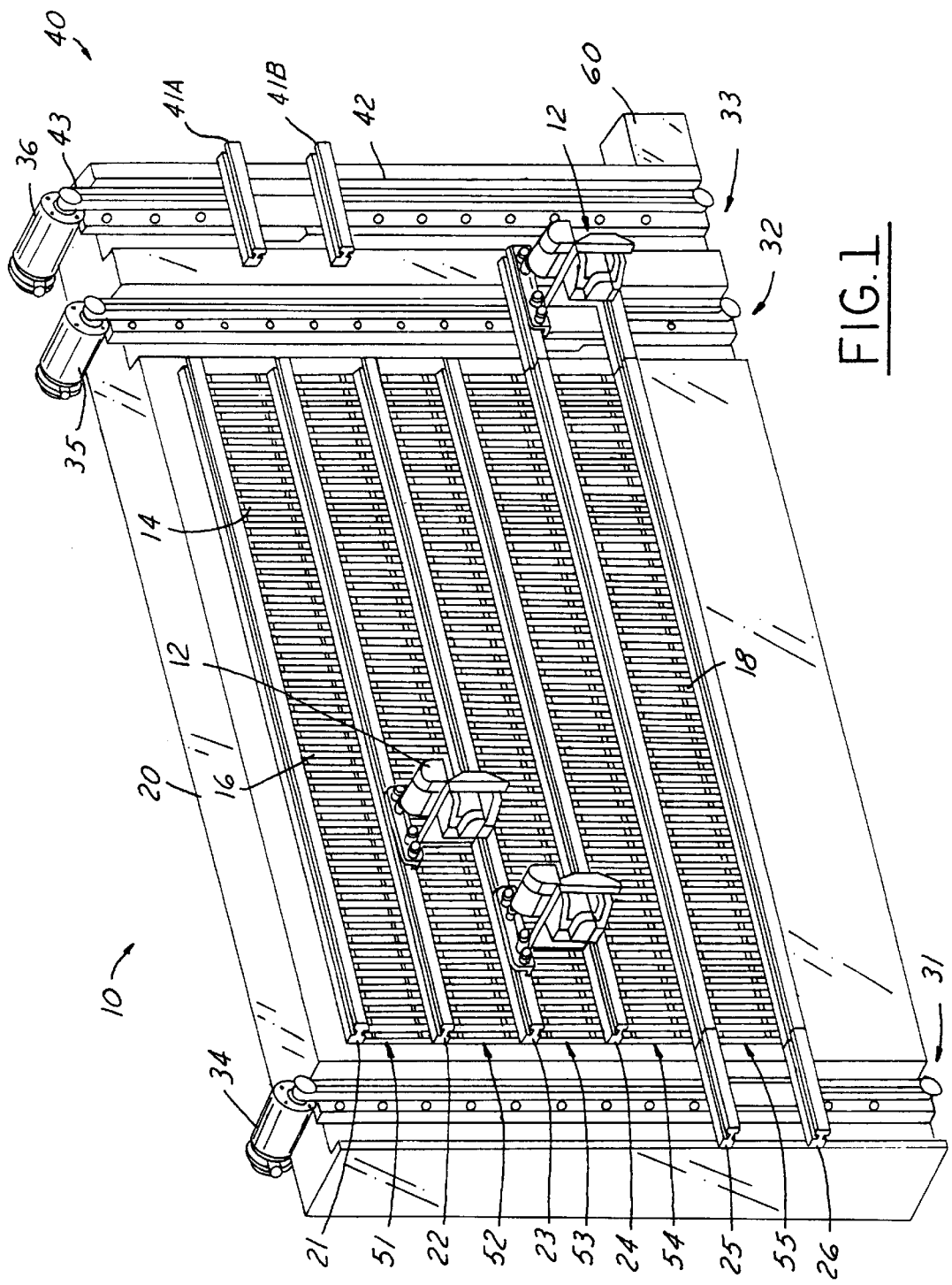
FIG. 1 illustrates a perspective view of an automated storage library in accordance with the present invention.

Referring now to FIG. 1, an automated storage library 10 for use with the present invention is shown. Storage library 10 includes multiple independent robotic mechanisms (robotic pods) 12 to enable the storage library to concurrently manipulate multiple media objects such as media cartridges 14. Storage library 10 includes a two-dimensional vertical standing array of media cartridge storage cells 16 and media cartridge players 18 that are mounted in a frame 20. A system of tracks 21–26 is used to guide robotic mechanisms 12 through all of the locations of the array. A system of electric powered rails are associated with tracks 21–26. Robotic mechanisms 12 contain a moveable carriage that is capable of transporting robotic components, such as media cartridge pickers, bar code reading devices, and other task oriented sub-modules on tracks 21–26 of storage library 10.

Frame 20 is designed to receive a plurality of rows 51–56 of media cartridge storage cells 16 each of which is designed to house a single media cartridge 14. Media cartridge players 18 are shown in an arbitrary location in a horizontal row 55 at the bottom of frame 20, although storage library 10 can incorporate media cartridge players at any location in the frame to optimize performance. Robotic mechanisms 12 are attached to frame 20 via horizontal guide tracks 21–26 which serve to frame media cartridge storage cells 16 and media cartridge players 18 on the top and bottom sides thereof. Storage library 10 includes an array of media cartridge storage cells 16 fully populated with media cartridges 14 of any type. Tracks 21–26 provide support of robotic mechanisms 12 in the vertical direction to oppose the force of gravity, and they also provide a meshing surface to impart traction in the horizontal direction for motive transport of the robotic mechanisms. Robotic mechanisms 12 each incorporate drive means for propulsion in the horizontal direction along guide tracks 21–26.

Storage library 10 further includes vertical elevator assemblies 31–33 that enable the transfer of robotic mechanisms 12 in the vertical direction. Each of vertical assemblies 31–33 includes a set of vertical rails 42 that extend substantially from the top of frame 20 to the bottom of the frame. Vertical rails 42 support elevator stations 40 each of which contains short horizontal track segments 41A, 41B that are identical in cross section to the main horizontal guide tracks 21–26. Elevator stations 40 are held in suspension by drive belts 43 which wrap around a respective drive pulley attached to a respective drive motor 34–36. When a vertical displacement is required of any robotic mechanism 12, vertical elevator 40 is scheduled to move in alignment to the appropriate level of rows 51–55 to allow transfer of the robotic mechanism onto elevator track segments 41A, 41B from the pair of horizontal tracks 21–26 that are juxtaposed and abutting to elevator track segments 41A, 41B. Once robotic mechanism 12 is located on elevator station 40, drive motor 36 is activated to transport the robotic mechanism to a selected one of rows 51–55 and thence moves on to the pair of horizontal tracks 21–26 corresponding to the selected row.

A storage library control unit (controller) 60 provides commands to robotic mechanisms 12 and elevator stations 40 to manipulate media cartridges 14. Controller 60 communicates with each robotic mechanism 12 individually by radio frequency communication links, infrared communication links, or other wireless links. Wired communication links may also be used. Commands to robotic mechanisms 12 include movement along tracks 21–26, movement of media cartridges 14 into and out of the robotic mechanisms, reading bar codes on the media cartridges, and the like.

Controller 60 and robotic mechanisms 12 are operable with one another such that the controller knows the position of the robotic mechanisms within storage library 10 as they move about tracks 21–26. This is accomplished by mounting position sensors on robotic mechanisms 12 which provide information regarding the position of the robotic mechanisms to controller 60. This may also be accomplished by providing sensors on tracks 21–26 which are actuated to transmit a signal to controller 60 when a robotic mechanism 12 traverses a sensor on tracks 21–26. This may further by accomplished by having robotic mechanisms 12 provide information to controller 60 regarding the speed and direction of their travels through storage library 10.

Controller 60 may also be in communication with media cartridge players 18. In one embodiment, controller 60 provides commands to mount and dismount media cartridges 14 into and out of media cartridge players 18. Controller 60 coordinates these commands with positioning commands to a robotic mechanism 12 that supplies or receives a media cartridge 14 to and from a media cartridge player 18. In an alternative embodiment, an external source (not shown) provides the mount and dismount commands directly to media cartridge players 18. Here, controller 60 coordinates with the external source to position the proper robotic mechanism 12 adjacent media cartridge player 18 prior to the mount or dismount command being given to the media cartridge player.

Figure 2:
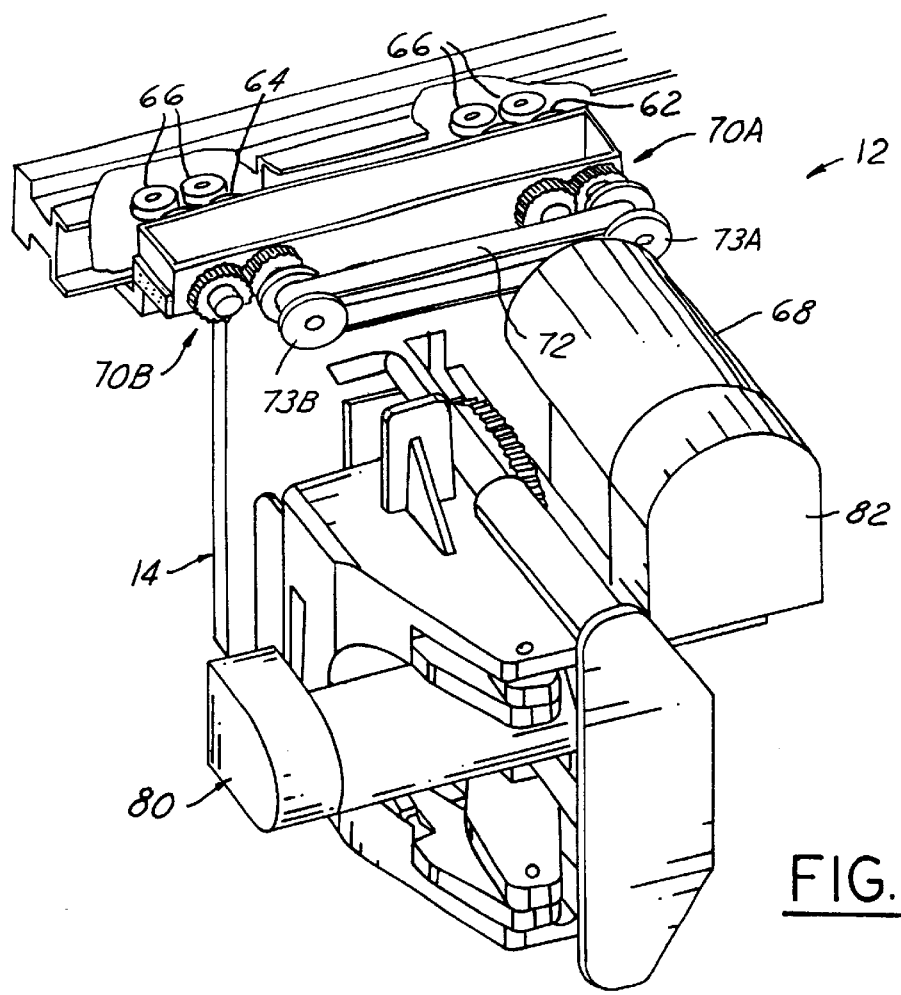
FIG. 2 illustrates a perspective view of a robotic mechanism in accordance with the present invention.

Referring now to FIG. 2, a perspective view of a robotic mechanism 12 for riding on tracks 21–26 is shown. Robotic mechanism 12 includes a base assembly having a frame 62 for structural support. Frame 62 suspends in a track by drive wheels 64 that ride in a main groove provided in the tracks. The base assembly includes two pair of drive wheels 64. Rotation of drive wheels 64 causes robotic mechanism 12 to move along a track of storage library 10. Drive wheels 64 rotate clockwise and counterclockwise to allow robotic mechanism 12 to move in both directions along a track of storage library 10. Idler wheels 66 are rotatably mounted in frame 62. Idler wheels 66 move in additional grooves provided in the tracks. Idler wheels 66 help orient and guide robotic mechanism 12 with respect to media cartridge storage cells 16 and media cartridge players 18.

Robotic mechanism 12 also includes a track propulsion drive motor or mechanism 68 for driving drive wheels 64 to move the robotic mechanism along the tracks of storage library 10. Drive mechanism 68 is operable to drive two pairs of drive gears 70A, 70B and belt 72 that interconnects the pairs of drive gears for driving drive wheels 64. Belt 72 wraps around a pair of drive pulleys 73A, 73B. Each drive pulley 73A, 73B is coupled to a respective one of the pair of drive pulleys 73A, 73B. Rotation of drive pulleys 73A, 73B by belt 72 and drive mechanism 68 causes the pairs of drive gears 70A, 70B to rotate. Each drive wheel 64 is also coupled to a respective one of the pairs of drive gears 70A, 70B. Rotation of drive gears 70A, 70B causes drive wheels 64 to rotate for moving robotic mechanism 12. Drive mechanism 68 includes a drive shaft operable for driving drive belt 72 and drive pulleys 73A, 73B.

Robotic mechanism 12 further includes a gripper mechanism 80. Gripper mechanism 80 is operable to move to an extended position to grasp a media cartridge 14 from a media cartridge storage cell 16 or media cartridge player 18 and to move back to a retracted position to pull the media cartridge into robotic mechanism 12. Robotic mechanism 12 may then move along tracks 21–26 to transport the selected media cartridge to a designated location. Likewise, gripper mechanism 80 is operable to move from a retracted position to an extended position to place a media cartridge 14 into a media cartridge storage cell 16 or media cartridge player 18.

In accordance with a first embodiment of the present invention, robotic mechanism 12 further includes an on-board energy source such as a battery 82 for providing electrical current to the secondary mechanisms of the robotic mechanism. Battery 82 is a rechargeable energy supply and supplies energy to drive mechanism 68 and gripper mechanism 80. Drive mechanism 68 and gripper mechanism 80 use the energy to perform their functions such as moving robotic mechanism 12 and gripping media cartridges 14. As noted above, a problem occurs when battery 82 runs low and there is not enough energy for either drive mechanism 68 or gripper mechanism 80 to perform their functions.

In accordance with an alternative embodiment of the present invention, robotic mechanism 12 receives electrical energy from a remote energy source via the electric powered rails. The electric powered rails serve as a conduit for transferring energy from the remote energy source to robotic mechanism 12 for supplying energy to drive mechanism 68 and gripper mechanism 80 to perform their functions. As noted above, a problem occurs when robotic mechanism 12 is not receiving enough energy from the electric powered rails for drive mechanism 68 and gripper mechanism 80 to perform their functions. This may be a result of an improper mechanical condition with the connection between the rails and robotic mechanism 12. In general, robotic mechanism 12 may receive energy directly from an on-board energy source or from a remote energy source via the electric powered rails or from a combination of these two energy sources.

Figure 4:
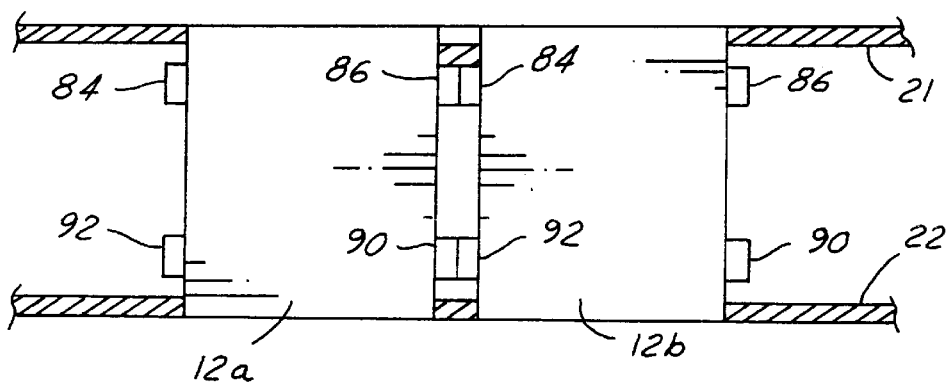
FIG. 4 illustrates a side view of a first robotic mechanism mated to a second robotic mechanism in accordance with the present invention.
Figure 3:
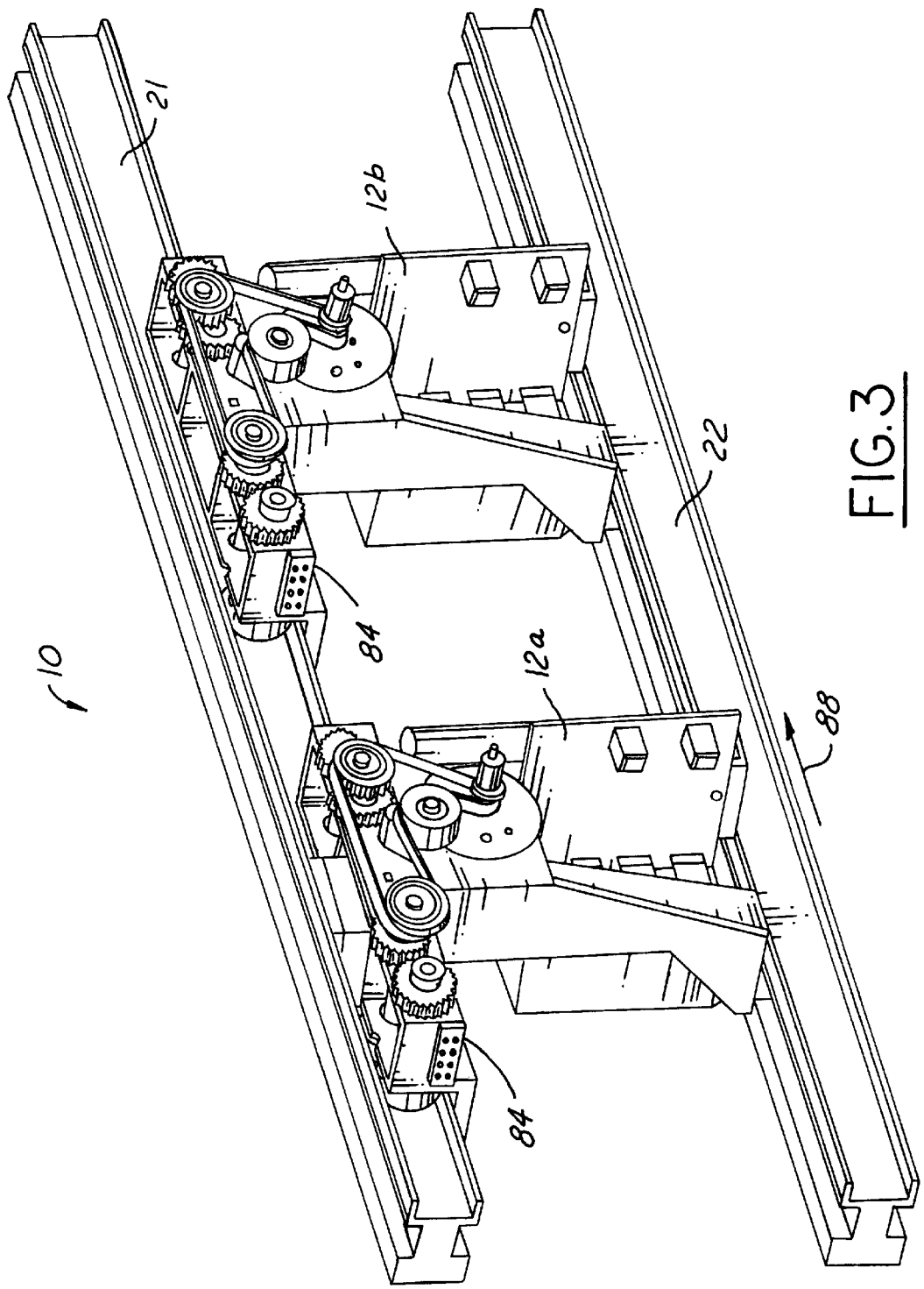
FIG. 3 illustrates a partial perspective view of two robotic mechanisms mounted on a pair of tracks of an automated storage library in accordance with the present invention.

FIG. 3 illustrates a partial perspective view of two robotic mechanisms 12a, 12b mounted to tracks 21, 22 of storage library 10. FIG. 4 illustrates a side view of a first robotic mechanism 12a mated to a second robotic mechanism 12b. Robotic mechanisms 12a, 12b are shown in FIG. 3 without drive mechanism 68, gripper mechanism 80, and battery 82 to facilitate the description of the present invention.

In accordance with the present invention, each robotic mechanism 12a, 12b includes a pair of energy couplers 84, 86. For each robotic mechanism 12, a first energy coupler 84 is located at one end of frame 62 and a second energy coupler 86 is located at the other end of the frame. Energy transfer is conducted between robotic mechanisms 12a, 12b through energy couplers 84, 86. For example, energy coupler 86 of robotic mechanism 12a couples with energy coupler 84 of robotic mechanism 12b to transfer energy from one of the robotic mechanisms to the other robotic mechanism.

The energy transferred through energy couplers 84, 86 may have various different forms. For instance, the transferred energy may be electrical energy such as electrical current, magnetic energy, infrared energy, mechanical energy, and the like. The manner in which energy couplers 84, 86 couple together may also have various different forms. For example, the coupling between energy couplers 84, 86 may be a mechanical interconnection for transferring electrical energy, aligned but separated energy couplers 84, 86 for transferring infrared energy or magnetic energy, and the like.

Each energy coupler 84, 86 of a robotic mechanism 12 is coupled to battery 82 of the robotic mechanism to transfer energy from the battery to another robotic mechanism. Further, each energy coupler 84, 86 of a robotic mechanism 12 is coupled to the electric powered rails to transfer energy from the rails to another robotic mechanism.

In operation, one of the robotic mechanisms 12a, 12b such as robotic mechanism 12b becomes stuck when its battery 82 runs low and becomes discharged. The discharged battery 82 is an energy load and robotic mechanism 12b is a disabled robotic mechanism because it cannot move. Robotic mechanism 12b may also become stuck because of a fault condition interrupting the supply of energy from the electric powered rails to the robotic mechanism. To remedy this situation, a functional robotic mechanism 12a having a charged battery 82 moves in the direction of arrow 88 toward robotic mechanism 12b. Functional robotic mechanism 12a engages disabled robotic mechanism 12b such that energy coupler 86 of the functional robotic mechanism mates with energy coupler 84 of the disabled robotic mechanism. As described above, energy couplers 84, 86 may mechanically couple together or be separated apart from one another in order to mate with each other. As a result of the coupling between energy couplers 84, 86, functional robotic mechanism 12a in essence plugs itself into disabled robotic mechanism 12b.

Functional robotic mechanism 12a then supplies electrical energy from its battery 82 to disabled robotic mechanism 12b via energy couplers 84, 86. Disabled robotic mechanism 12b may use the energy from the charged battery 82 of functional robotic mechanism 12a to charge its battery 82 or to directly use the energy for running drive mechanism 68 and gripper mechanism 80.

Functional robotic mechanism 12a may also act as a conduit for transferring energy from the electric powered rails to disabled robotic mechanism 12b. In this situation, functional robotic mechanism 12a does not transfer energy from its battery to disabled robotic mechanism 12b, but rather transfers energy from the electric powered rails to the disabled robotic mechanism. In this situation, functional robotic mechanism 12a does not even need to have a battery. As before, disabled robotic mechanism 12b may use the energy from the powered rails via functional robotic mechanism 12a to charge its battery 82 or to directly use the energy for running drive mechanism 68 and gripper mechanism 80.

Upon receiving a sufficient amount of energy from functional robotic mechanism 12a, disabled robotic mechanism 12b becomes functional. Functional robotic mechanism 12a then disengages robotic mechanism 12b. Robotic mechanism 12b may then perform its duties such as moving along tracks 21–26 of storage library 10 and manipulating media cartridges 14. Robotic mechanism 12b can perform its functions because recharged battery 82 now is able to provide sufficient energy for these functions. Robotic mechanism 12b may also be able to perform its functions because the robotic mechanism 12b is now able to overcome the fault condition with the powered rails and directly receive energy from the powered rails by moving along the tracks to an area of storage library 10 having functional powered rails.

Energy couplers 84, 86 may include physical self-aligning features that assist in achieving the energy connections. Energy couplers 84, 86 may be oriented with respect to each other so that multiple contacts in each coupler mate coaxially, as in a pin and socket arrangement, in a planar fashion, as in a circuit board and wiper arrangement, or in any other fashion where two couplers are moved linearly toward each other.

The presence of energy couplers 84, 86 on each robotic mechanism 12 allows a functional robotic mechanism to act as a miniature energy source for charging another robotic mechanism. Once an energy coupler 84, 86 of a functional robotic mechanism 12 has mated with a corresponding energy coupler of a disabled robotic mechanism the functional robotic mechanism can recharge the disabled robotic mechanism.

Each robotic mechanism 12 further includes a mechanical coupler 90 and a mechanical coupler feature 92 for assisting in connecting an energy coupler 84 of one robotic mechanism to an energy coupler 86 of another robotic mechanism. Mechanical coupler 90 of one robotic mechanism is activated to engage mechanical coupler feature 92 of another robotic mechanism after energy couplers 84, 86 have mated to physically hold the two robotic mechanisms together during the electrical energy transfer process. After the electrical charging process has been completed, mechanical coupler 90 disengages mechanical coupler feature 92 to allow the robotic mechanisms to move away from each other.

Thus it is apparent that there has been provided, in accordance with the present invention, an automated storage library method and system for transferring energy from a functional robotic mechanism to a disabled robotic mechanism for enabling the disabled robotic mechanism to become functional that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library comprising:

a first robotic mechanism having an energy coupler;

a second robotic mechanism having an energy coupler, wherein the energy coupler of the first robotic mechanism couples with the energy coupler of the second robotic mechanism to transfer energy from the first robotic mechanism to the second robotic mechanism.

2. The storage library of claim 1 wherein:

the first robotic mechanism has an energy source, wherein the energy coupler of the first robotic mechanism couples with the energy coupler of the second robotic mechanism to transfer energy from the energy source of the first robotic mechanism to the second robotic mechanism.

3. The storage library of claim 1 wherein:

the second robotic mechanism has an energy source, wherein the energy coupler of the first robotic mechanism couples with the energy coupler of the second robotic mechanism to transfer energy from the first robotic mechanism to the energy source of the second robotic mechanism.

4. The storage library of claim 1 wherein:

the second robotic mechanism includes a propulsion mechanism, wherein the energy coupler of the first robotic mechanism couples with the energy coupler of the second robotic mechanism to transfer energy from the first robotic mechanism to the second robotic mechanism in order to drive the propulsion mechanism.

5. The storage library of claim 1 wherein:

the second robotic mechanism includes a gripper mechanism, wherein the energy coupler of the first robotic mechanism couples with the energy coupler of the second robotic mechanism to transfer energy from the first robotic mechanism to the second robotic mechanism in order to drive the gripper mechanism.

6. The storage library of claim 1 wherein:

the energy transferred between the first and second robotic mechanism is electrical energy.

7. The storage library of claim 1 wherein:

the energy transferred between the first and second robotic mechanism is magnetic energy.

8. The storage library of claim 1 wherein:

the energy transferred between the first and second robotic mechanism is infrared energy.

9. The storage library of claim 1 wherein:

the energy transferred between the first and second robotic mechanism is mechanical energy.

10. A storage library for the storage and retrieval of media objects, the storage library comprising:

a plurality of media object storage cells each housing a media object;

tracks disposed adjacent to the media object storage cells for enabling access to each of the media object storage cells;

a first robotic mechanism having an energy coupler, the first robotic mechanism being movable along the tracks; and a second robotic mechanism having an energy coupler, wherein the first robotic mechanism moves along the tracks toward the second robotic mechanism to enable the energy coupler of the first robotic mechanism to couple with the energy coupler of the second robotic mechanism to transfer energy from the first robotic mechanism to the second robotic mechanism.

11. The storage library of claim 10 further comprising:

powered rails associated with the tracks for providing energy, wherein the energy coupler of the first robotic mechanism couples with the energy coupler of the second robotic mechanism to transfer energy from the powered rails to the second robotic mechanism.

12. The storage library of claim 10 wherein:

the first robotic mechanism has an energy source, wherein the energy coupler of the first robotic mechanism couples with the energy coupler of the second robotic mechanism to transfer energy from the energy source of the first robotic mechanism to the second robotic mechanism.

13. The storage library of claim 10 wherein:

the second robotic mechanism has an energy source, wherein the energy coupler of the first robotic mechanism couples with the energy coupler of the second robotic mechanism to transfer energy from the first robotic mechanism to the energy source of the second robotic mechanism.

14. The storage library of claim 10 wherein:

wherein the energy coupler of the first robotic mechanism couples with the energy coupler of the second robotic mechanism to transfer energy from the first robotic mechanism to the second robotic mechanism while the storage library is operating.

15. The storage library of claim 10 wherein:

the second mechanism has a secondary mechanism, wherein the energy coupler of the first robotic mechanism couples with the energy coupler of the second robotic mechanism to transfer energy from the first robotic mechanism to the second robotic mechanism in order to drive the secondary mechanism.

16. The storage library of claim 10 wherein:

the second robotic mechanism includes a propulsion mechanism for moving the second robotic mechanism along the tracks, wherein the energy coupler of the first robotic mechanism couples with the energy coupler of the second robotic mechanism to transfer energy from the first robotic mechanism to the second robotic mechanism in order to drive the propulsion mechanism for moving the second robotic mechanism along the tracks.

17. The storage library of claim 10 wherein:

the second robotic mechanism includes a gripper mechanism for gripping the media objects, wherein the energy coupler of the first robotic mechanism couples with the energy coupler of the second robotic mechanism to transfer energy from the first robotic mechanism to the second robotic mechanism in order to drive the gripping mechanism for gripping the media objects.

18. A method for operating a storage library, the method comprising:

providing a first robotic mechanism having an energy coupler;

providing a second robotic mechanism having an energy coupler; and coupling the energy coupler of the first robotic mechanism with the energy coupler of the second robotic mechanism to transfer energy from the first robotic mechanism to the second robotic mechanism.

19. The method of claim 18 further comprising:

providing the first robotic mechanism with an energy source; and coupling the energy coupler of the first robotic mechanism with the energy coupler of the second robotic mechanism to transfer energy from the energy source of the first robotic mechanism to the second robotic mechanism.

20. The method of claim 18 further comprising:

providing the second robotic mechanism with an energy source; and coupling the energy coupler of the first robotic mechanism with the energy coupler of the second robotic mechanism to transfer energy from the first robotic mechanism to the energy source of the second robotic mechanism.

21. The method of claim 18 further comprising:

providing the second robotic mechanism with a propulsion mechanism; and coupling the energy coupler of the first robotic mechanism with the energy coupler of the second robotic mechanism to transfer energy from the first robotic mechanism to the second robotic mechanism in order to drive the propulsion mechanism.

22. The method of claim 18 further comprising:

providing the second robotic mechanism with a gripper mechanism; and coupling the energy coupler of the first robotic mechanism with the energy coupler of the second robotic mechanism to transfer energy from the first robotic mechanism to the second robotic mechanism in order to drive the gripper mechanism.

23. The method of claim 18 further comprising:

moving the first robotic mechanism toward the second robotic mechanism to enable the energy coupler of the first robotic mechanism to couple with the energy coupler of the second robotic mechanism.

* * * * *